US012664194B1

(12) United States Patent
Cohen et al.

(10) Patent No.: US 12,664,194 B1
(45) Date of Patent: Jun. 23, 2026

(54) RETRIEVAL AUGMENTED GENERATION GUIDED AUTOMATED EVENT DETECTION USING MACHINE LEARNING MODELS

(71) Applicant: INTUIT INC., Mountain View, CA (US)

(72) Inventors: Linoy Cohen, New York City, NY (US); Hadar Lackritz, Hobeken, NJ (US); Eliran Ohel, New York City, NY (US); Ricardo Alejandro Quinones, Brooklyn, NY (US); Itamar Sasson, New York City, NY (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/345,616

(22) Filed: Sep. 30, 2025

(51) Int. Cl.
*G06F 16/334* (2025.01)
*G06F 16/3329* (2025.01)
*G06F 16/901* (2019.01)

(52) U.S. Cl.
CPC ...... *G06F 16/3347* (2019.01); *G06F 16/3329* (2019.01); *G06F 16/9024* (2019.01)

(58) Field of Classification Search
CPC ................................................. G06F 16/3347
USPC ....................................................... 707/736
See application file for complete search history.

(56) References Cited

U.S. PATENT DOCUMENTS

| | | | |
|---|---|---|---|
| 2023/0224493 A1* | 7/2023 | Foley ................... | G06N 3/0985 375/240.12 |
| 2023/0325164 A1* | 10/2023 | Singh ........................ | G06F 8/51 717/137 |
| 2025/0139140 A1* | 5/2025 | Gopalan ............. | G06F 16/3329 |
| 2025/0258685 A1* | 8/2025 | Crabtree ................ | A63F 13/40 |

* cited by examiner

*Primary Examiner* — Muluemebet Gurmu
(74) *Attorney, Agent, or Firm* — Patterson + Sheridan, LLP

(57) ABSTRACT

Techniques described herein involve automated event detection using retrieval augmented generation and machine learning models. Embodiments include creating a directed graph for each of a plurality of interactive sessions based on attributes associated with the interactive sessions and generating an embedding of the directed graph for each of the plurality of interactive sessions. Embodiments include storing the embedding of the directed graph for each of the plurality of interactive sessions in a vector database and, in response to an input session, retrieving one or more embeddings related to the input session from the vector database. Embodiments include selecting a subset of the one or more embeddings based on a prompt provided to a language processing machine learning model. Embodiments include comparing features associated with the subset of the one or more embeddings to features associated with an embedding of the input session and performing an action based on the comparing.

17 Claims, 5 Drawing Sheets

100

200

EMBEDDINGS
122

RAG COMPONENT
215

INPUT
SESSION
204

RETRIEVING
210

RELEVANT
EMBEDDINGS
212

LANGUAGE MODEL
225

SELECTING
220

OPTIMAL
EMBEDDINGS
222

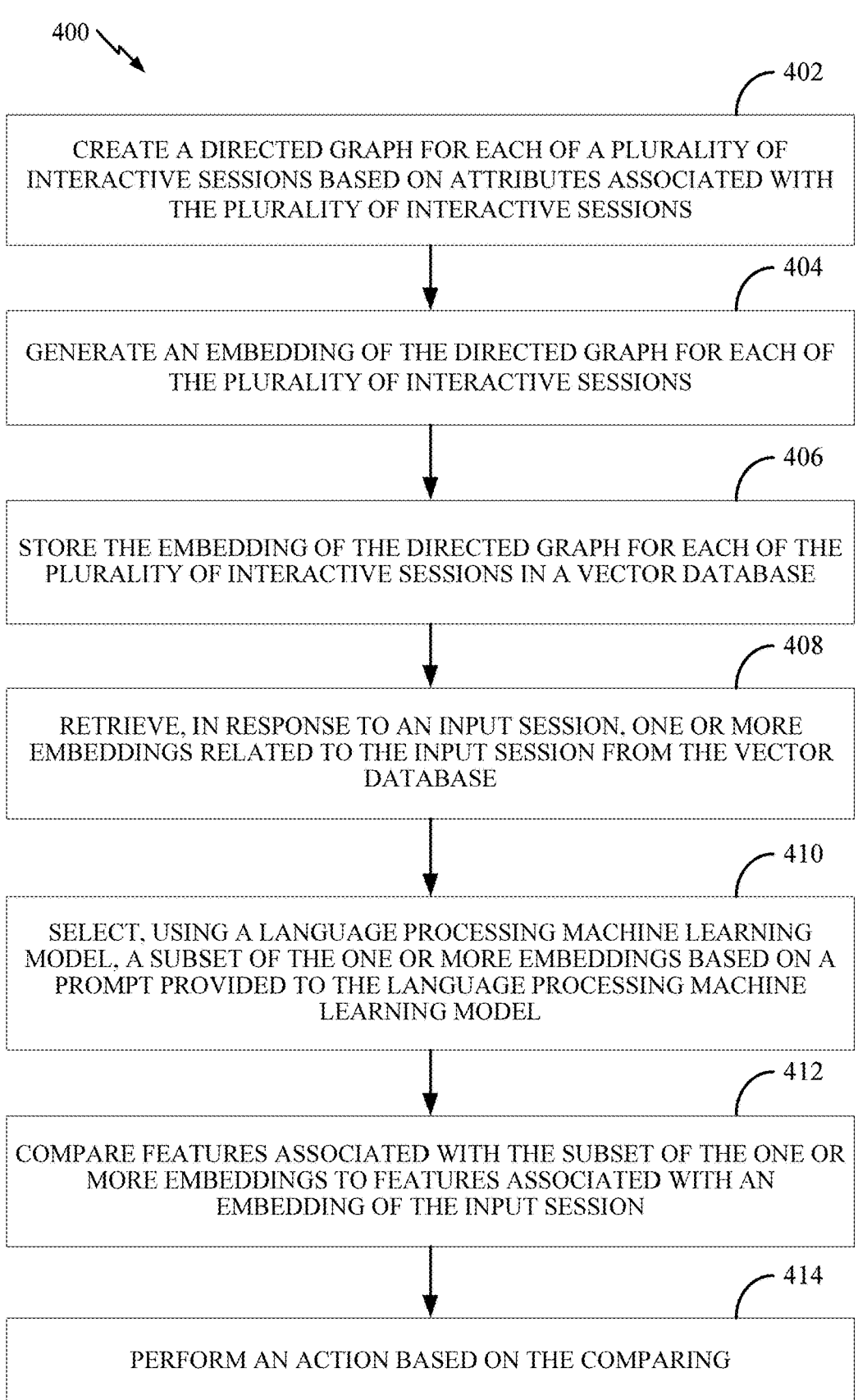

400

402

CREATE A DIRECTED GRAPH FOR EACH OF A PLURALITY OF INTERACTIVE SESSIONS BASED ON ATTRIBUTES ASSOCIATED WITH THE PLURALITY OF INTERACTIVE SESSIONS

404

GENERATE AN EMBEDDING OF THE DIRECTED GRAPH FOR EACH OF THE PLURALITY OF INTERACTIVE SESSIONS

406

STORE THE EMBEDDING OF THE DIRECTED GRAPH FOR EACH OF THE PLURALITY OF INTERACTIVE SESSIONS IN A VECTOR DATABASE

408

RETRIEVE, IN RESPONSE TO AN INPUT SESSION, ONE OR MORE EMBEDDINGS RELATED TO THE INPUT SESSION FROM THE VECTOR DATABASE

410

SELECT, USING A LANGUAGE PROCESSING MACHINE LEARNING MODEL, A SUBSET OF THE ONE OR MORE EMBEDDINGS BASED ON A PROMPT PROVIDED TO THE LANGUAGE PROCESSING MACHINE LEARNING MODEL

412

COMPARE FEATURES ASSOCIATED WITH THE SUBSET OF THE ONE OR MORE EMBEDDINGS TO FEATURES ASSOCIATED WITH AN EMBEDDING OF THE INPUT SESSION

414

PERFORM AN ACTION BASED ON THE COMPARING

FIG. 4

RETRIEVAL AUGMENTED GENERATION GUIDED AUTOMATED EVENT DETECTION USING MACHINE LEARNING MODELS

INTRODUCTION

Aspects of the present disclosure relate to techniques for automated event detection using retrieval augmented generation and machine learning models. In particular, techniques described herein involve creating directed graphs for a plurality of interactive sessions, generating embeddings for the directed graphs, and storing the embeddings in a vector database. Techniques described herein further involve retrieving one or more embeddings from the vector database that are related to an input session, selecting a subset of those embeddings using a machine learning model and a prompt provided to the model, and comparing features associated with the subset of embeddings to features associated with an embedding of the input session.

BACKGROUND

Every year, millions of people, businesses, and organizations around the world use software applications to assist with countless aspects of life. Because of this, software applications are increasingly the target of adverse events such as fraudulent activity. When that fraud is successful, sensitive data, including financial, personal, and otherwise, may be compromised or at risk. Such a breach may have lasting, personal impacts on individuals, and global ramifications for a company. Attacks against and within software applications are increasingly sophisticated and swift but current techniques for fraud detection rely on static and/or historical data, which is limited and takes time to collect. This leads to delayed and inaccurate detection of adverse events, and such events may go undetected or may only be detected long after they occur. By the time the event is detected, if it is at all, data associated with the user and/or software application may already be compromised.

Thus, there is a need in the art for improved techniques for automated event detection in software applications.

BRIEF SUMMARY

Certain embodiments provide a method for automated fraud detection using retrieval augmented generation and machine learning models. The method generally includes: creating a directed graph for each of a plurality of interactive sessions based on attributes associated with the plurality of interactive sessions; generating an embedding of the directed graph for each of the plurality of interactive sessions; storing the embedding of the directed graph for each of the plurality of interactive sessions in a vector database; retrieving, in response to an input session, one or more embeddings related to the input session from the vector database; selecting, using a language processing machine learning model, a subset of the one or more embeddings based on a prompt provided to the language processing machine learning model; comparing features associated with the subset of the one or more embeddings to features associated with an embedding of the input session; and performing an action based on the comparing.

Other embodiments provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 depicts example operations related to automated event detection using retrieval augmented generation and machine learning models.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
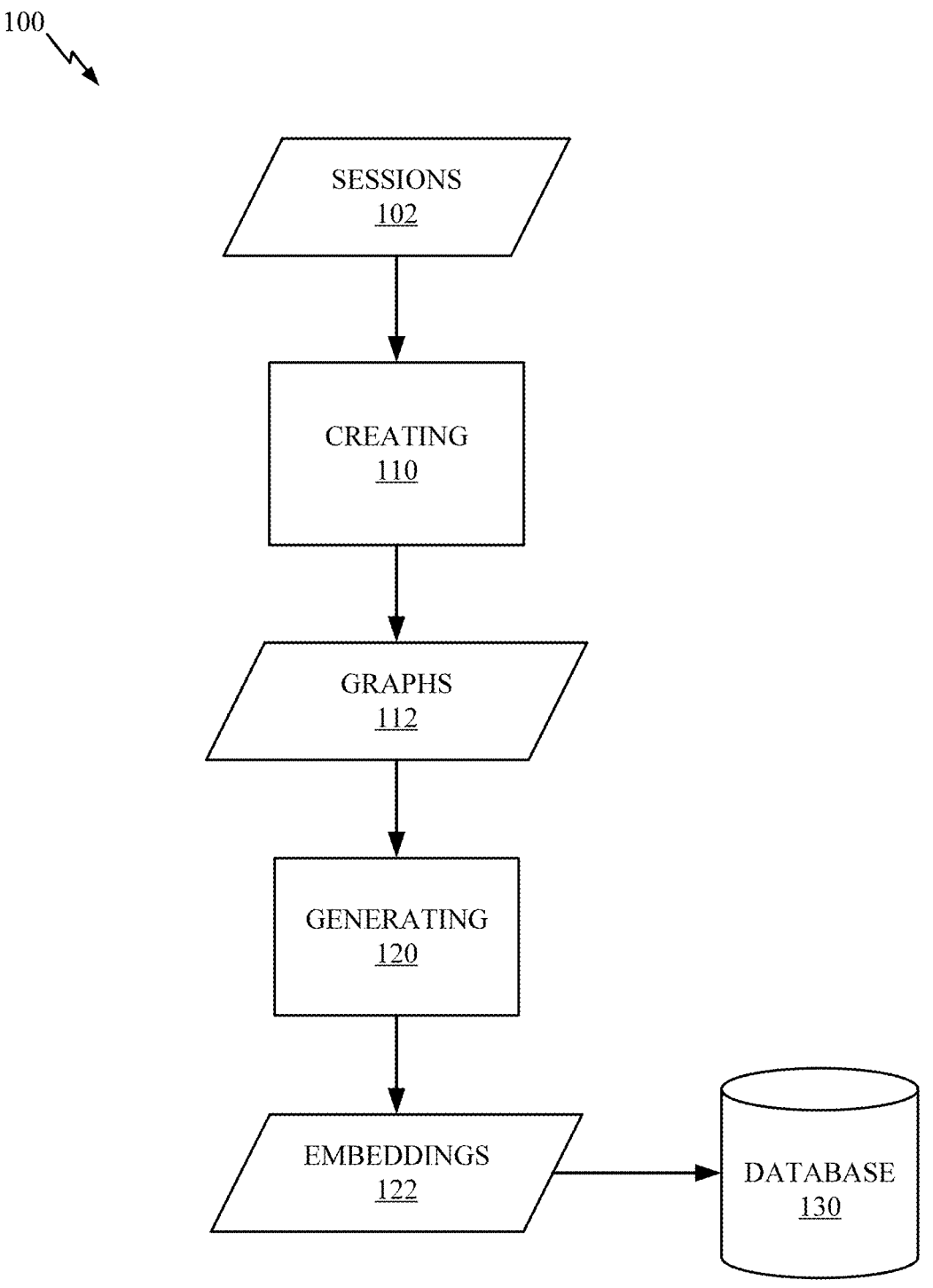
FIG. 1 depicts an example workflow related to automated event detection using retrieval augmented generation and machine learning models.

Aspects of the present disclosure provide apparatuses, methods, processing systems, and computer-readable mediums for automated event detection using retrieval augmented generation and machine learning models.

Adverse events such as fraud pose an increasingly large threat to individual and institutional data privacy and security, especially as attacks have become more sophisticated and fast-moving, which may lead to vast amounts of sensitive personal and/or financial data being compromised. Current techniques for detecting such events are limited in scope by smaller amounts and/or types of data. As a result, those techniques are inefficient and inaccurate. To improve automated event detection, techniques described herein employ machine learning models to automatically compare an embedding of an input session to embeddings of directed graphs associated with interactive sessions, retrieved via a retrieval augmented generation (RAG) process, and thereby determine whether to flag the input session as being associated with an adverse event (e.g., being fraudulent). Such techniques result in an automated process for event detection that is more efficient, more accurate, and more thorough, improving downstream adverse event prevention and mitigation.

For example, a directed graph for each of a plurality of interactive sessions may be created based on attributes associated with the interactive sessions. Interactive sessions may include an application programming interface (API)

session such as when a user logs on to a software application, web application, and/or the like and proceeds to perform one or more tasks (e.g., clicks on a link, fills out a form, etc.). The directed graph may graphically represent data from the associated interactive session. For example, nodes in the directed graph may correspond to an event associated with a particular interactive session (e.g., a user clicking on a specific page within a software application), a timestamp associated with that event, and/or an elapsed time from a previous event to that event. An embedding, or vector representation, for the directed graph for each of the plurality of interactive sessions may then be generated and the resulting embeddings may be stored in a vector database.

Then, in response to an input session, one or more embeddings that are related to the input session may be retrieved from the vector database. The input session may be a presently initiated API session while the interactive sessions may correspond to previous API sessions (e.g., already terminated) that are stored for use as context data. Retrieving the relevant embeddings may include generating the embedding of the input session and searching the vector database based on the embedding of the input session using a RAG technique. Generally, RAG involves optimizing the output of a machine learning model such as a language processing machine learning model by referencing an authoritative knowledge base outside of training data sources before generating a response. Using a language processing machine learning model, such as a large language model or small language model, a subset of the relevant embeddings may be selected based on a prompt provided to the model. In this way, the potential similar embeddings are further narrowed down to the most relevant embeddings, ensuring greater accuracy and conserving computing resources (e.g., since less embeddings have to be processed). Selecting the subset of embeddings may include determining the K-most similar embeddings (i.e., of the embeddings retrieved in the prior step) by calculating distance scores between the embedding of the input session and each of the retrieved embeddings.

Features associated with the selected embeddings may be compared to features associated with the embedding of the input session, such as event type, activity patterns, elapsed time, and/or the like. An action may then be performed based on the comparing. For example, a classification may be assigned to the input session (e.g., flagging it as being associated with an adverse event, such as being fraudulent) if the embedding of the input session matches more than a threshold number of embeddings in the selected embeddings that contain a particular label (e.g., the input session matches a certain number of interactive sessions that were previously labeled as being associated with an adverse event). Assigning the classification may occur more than a threshold amount of time after initiation of the input session and prior to termination of the input session (e.g., flagging the input session as fraudulent occurs in real-time), which gives time for session data to be gathered (i.e., for the comparing) but before activity related to an adverse event may be completed. An indication of the classification may then be displayed via a user interface or sent to one or more elements of a software application.

Embodiments of the present disclosure provide numerous technical and practical effects and benefits. As noted above, swift and accurate detection of adverse events is imperative in maintaining secure, operational, and trustworthy software applications. Existing techniques for adverse event detection, however, are limited in their knowledge bases and processing capabilities and, as a result, are inefficient and/or inaccurate. The result is undetected fraudulent activity which causes more data to be compromised while also increasing costs to both implement more protections and to mitigate the loss of the sensitive data once the damage is done. The present disclosure solves this technical problem. Techniques described herein ensure accurate and efficient detection of adverse events such as fraud by automatically comparing relevant interactive sessions to a current input session to determine whether the input session is associated with an adverse event. For example, directed graphs for past interactive sessions are first created and embeddings for the directed graphs are generated and stored in a vector database. Then, embeddings related to an input session are retrieved from the vector database and are narrowed down using a language processing machine learning model, ensuring that the most relevant context data is used while simultaneously saving energy and computing resources. Lastly, the embeddings are compared to an embedding of the input session to determine whether the input session matches any interactive session previously marked as being associated with an adverse event and, if the input session matches more than a threshold number of interactive sessions marked as being associated with an adverse event, the input session may be flagged as being associated with an adverse event. This automated process may be performed in real-time, so that fraudulent activity may be identified and stopped before damage is caused (e.g., sensitive data is compromised, etc.). These techniques not only save resources during the adverse event detection, but they also save resources that would otherwise be expended due to delayed detection and/or errors in the detection by reducing the time for identification and detection.

Example Workflows Related to Automated Event
Detection Using Retrieval Augmented Generation
and Machine Learning Models FIG. 1 depicts an example workflow 100 related to automated event detection using retrieval augmented generation and machine learning models. For example, workflow 100 may represent a series of steps associated with generating and storing embeddings of directed graphs created from a plurality of interactive sessions.

First, graphs 112 may be created, during creating 110, from a plurality of sessions 102. The sessions 102 may comprise API sessions consisting of temporary, authenticated interactions between a client (such as an application or a user) and a server-side API, wherein an API refers to a set of rules and protocols that allows different software applications to communicate and exchange data with each other (i.e., acting as a digital bridge or intermediary between systems). For example, a session of session 102 may comprise a compilation of a user's actions within a software application from when the user logs on to the software application and proceeds to perform one or more tasks (e.g., clicks on a link, fills out a form, etc.), to when the user terminates the encounter (e.g., logs off, closes out, or otherwise stops interacting with the software application, such as being inactive for a threshold amount of time). In some embodiments, each graph of graphs 112 may be a directed graph corresponding to a single session of sessions 102. In other embodiments, a graph of graphs 112 may correspond to more than one session of sessions 102. A directed graph generally refers to a set of nodes, or vertices, connected by directed edges, or arcs, where each edge has a specific direction from one node to another. In this case, the nodes may correspond to an event associated with a particular interactive session, a timestamp associated with that event, and/or an elapsed time from a previous event to that event. For example, what pages, links, and/or the like that a user clicks on in a software application, how many times the user clicks on those items, what time the user clicked on them, and the period of time in between that click and other clicks may be recorded and then represented in the directed graph for a particular interactive session.

Next, during generating 120, embeddings 122 are generated for the graphs 112 (e.g., an embedding is generated for each graph of graphs 112). An embedding generally refers to a vector representation of an entity (e.g., a document) that represents the entity as a vector in n-dimensional space such that similar entities are represented by vectors that are close to one another in the n-dimensional space. Embeddings may be generated through the use of an embedding model, such as a neural network or other type of machine learning model that learns a representation (embedding) for an entity through a training process that trains the neural network based on a data set, such as a plurality of features of a plurality of entities. In one example, an embedding model used to generate embeddings comprises a Bidirectional Encoder Representations from Transformer (BERT) model, which involves the use of masked language modeling to determine embeddings. In a particular example, the embedding model comprises a Sentence-BERT model. In other embodiments, the embedding model may involve embedding techniques such as Word2Vec and GloVe embeddings. These are included as examples, and other techniques for generating embeddings are possible. In some embodiments, the directed graphs are converted into numeric embeddings using mappings (e.g., checksum-based conversions) and may include time deltas (e.g., associated with the directed graphs).

Lastly, the embeddings 122 may be stored in a vector database 130. In some embodiments, the vector database 130 may support nearest-neighbor retrieval techniques. The embeddings 122 may then be retrieved, such as for use in future fraud detection analysis, as described in more detail below with respect to FIG. 2 and FIG. 3.

Figure 2:
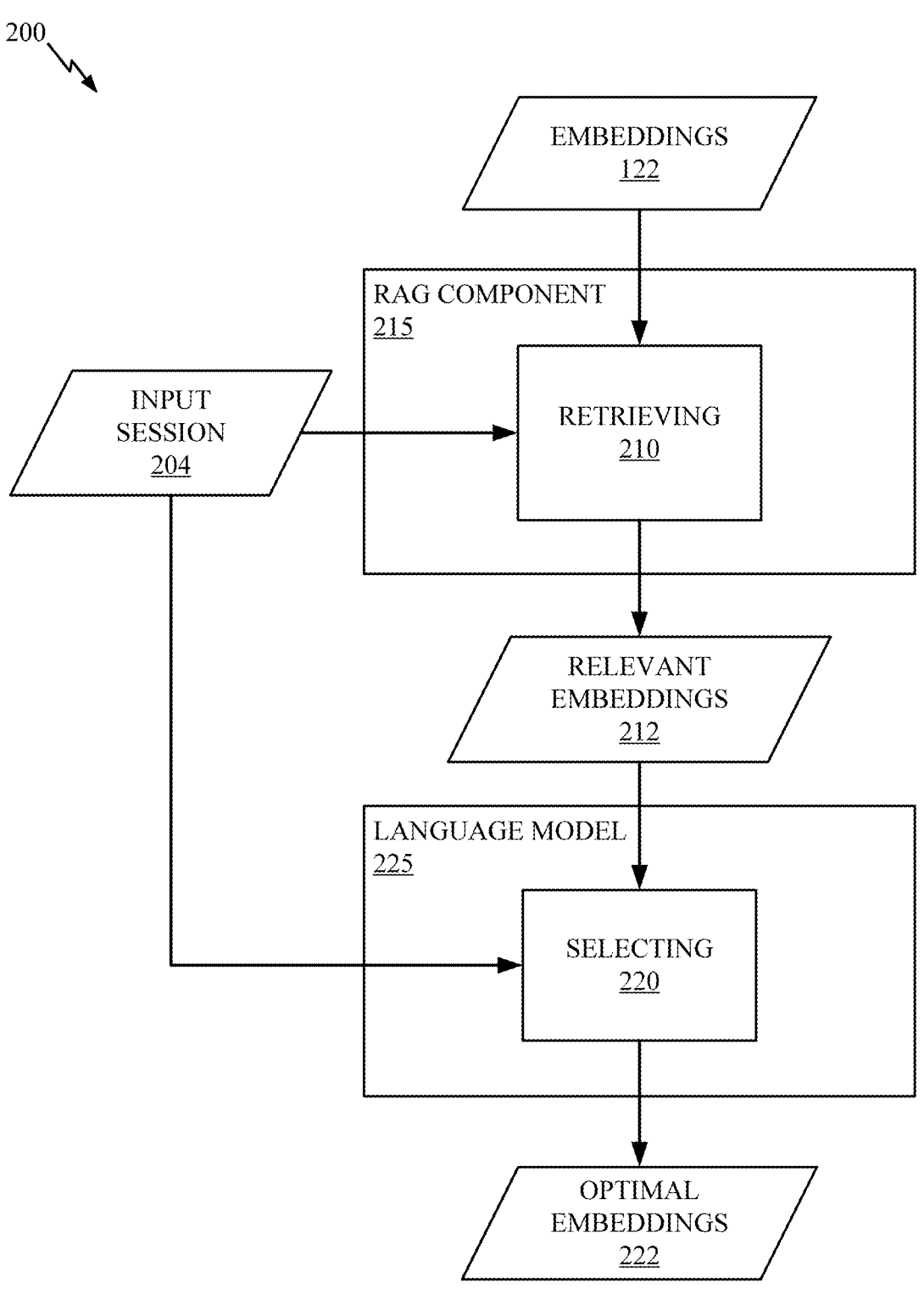
FIG. 2 depicts an additional example workflow related to automated event detection using retrieval augmented generation and machine learning models.

FIG. 2 depicts an additional example workflow 200 related to automated event detection using retrieval augmented generation and machine learning models. In particular, FIG. 2 depicts a series of steps by which relevant embeddings are retrieved, in response to an input session, from the vector database using a RAG process and a subset of those embeddings are selected by a machine learning model.

During retrieving 210, relevant embeddings 212 may be retrieved (e.g., from embeddings 122 stored in database 130) using a RAG component 215. The RAG component 215 may comprise a computing component configured to retrieve relevant context data from an external knowledge base (e.g., database 130 of FIG. 1) and/or to provide the relevant context data to a model (such as a machine learning model) for processing. The relevant embeddings 212 may comprise one or more embeddings of embeddings 122 that are related to an input session 204. In some embodiments, the relevant embeddings 212 may comprise more than one embedding of embeddings 122 and/or less than the total number of embeddings of embeddings 122. The input session 204 may comprise a recently initiated and/or ongoing API session (versus sessions 102 which comprise previous API sessions that were recorded and stored). Retrieving the relevant embeddings 212 may comprise generating an embedding of the input session (e.g., using an embedding model) and searching the database 130 based on similarities between the embedding of the input session 204 and the embeddings 122.

Optimal embeddings 222 may then be selected, using language model 225, during selecting 220. The language model 225 may comprise a machine learning model. In a particular example, language model 225 is a language processing machine learning model such as a large language model (LLM). For example, language model 225 may have been trained on a large training data set in order to process natural language inputs and generate natural language content in response. In some embodiments, language model 225 is a generative pre-trained transformer (GPT) model that has been trained on a large set of training data (e.g., across a plurality of domains), and is capable as a result of such training to perform a wide variety of language-related tasks in response to natural language prompts. In some embodiments, language model 225 has been fine-tuned for one or more particular domains, such as for use with a particular software application or for a specific purpose, while in other embodiments language model 225 has been trained in a more general fashion and has not been fine-tuned in such a manner. Language model 225 may have a large number of tunable parameters, which are iteratively adjusted during a model training process based on training data. In alternative embodiments, language model 225 may be another type of machine learning model that is capable of generating content. For example, language model 225 may be a generative adversarial network (GAN), an autoencoder model, an autoregressive model, a diffusion model, a Bayesian network, a hidden Markov model, and/or the like. In general, machine learning models such as LLMs are trained (and/or fine-tuned) by exposing the model to large datasets and iteratively adjusting internal parameters, such as to minimize an objective function. The objective function quantifies the difference between the model's predictions and the desired outputs (e.g., which may be indicated by labels in the training data or otherwise may be the target output of the model), guiding the optimization process to improve model performance over time.

The selecting 220 may be based on the relevant embeddings 212 and a prompt provided to the language model 225. For instance, the prompt may instruct the language model 225 to select a subset (e.g., between one embedding and the total number of embeddings) of the relevant embeddings 212 that are most closely related to the embedding of the input session 204 (e.g., based on graph structure, sequence overlap, and/or the like). In one example, the language model 225 may determine the K-most similar embeddings of the relevant embeddings 212 by analyzing calculated distance scores between the embedding of the input session 204 and each of the relevant embeddings 212. By narrowing down the embeddings 122 to relevant embeddings 212 and then to optimal embeddings 222, identifying fraudulent input sessions may be performed more efficiently and accurately, as only the most relevant embeddings are passed along for analysis. Optimal embeddings 222, in conjunction with the input session 204, may then be used for further analysis and fraud detection, as described in more detail below with respect to FIG. 3.

Figure 3:
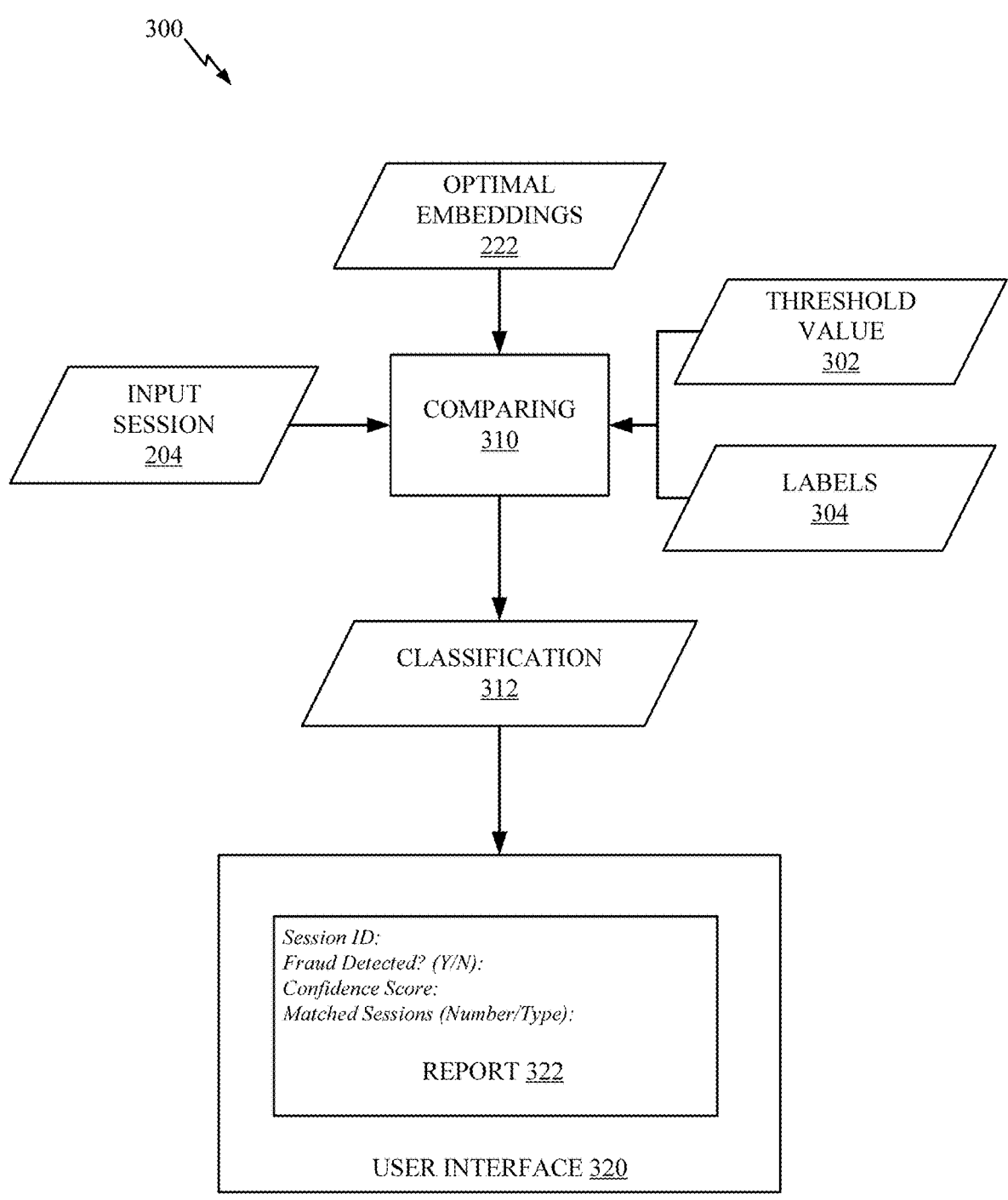
FIG. 3 depicts an additional example workflow related to automated event detection using retrieval augmented generation and machine learning models.

FIG. 3 depicts an additional example workflow 300 related to automated event detection using retrieval augmented generation and machine learning models. In particular, FIG. 3 depicts a series of steps associated with comparing features of the subset of relevant embeddings and the input session and generating a classification based on the comparing and labels associated with the embeddings.

Features associated with the embedding of the input session 204 may be compared, during comparing 310, to features associated with the optimal embeddings 222. For example, event type (e.g., link clicked, form completed, etc.), activity patterns (when the user typically performs an action, what typical actions are made, etc.), elapsed time (e.g., between events), and/or the like may be considered in determining whether the optimal embeddings 222 match the input session 204. There may be one or more labels 304 associated with each embedding of optimal embeddings 222. For example, a particular label may indicate that the associated embedding has been identified (e.g., in an offline review process) as fraudulent. If the input session 204 matches more than a threshold number of optimal embeddings 222 that contain a label indicating those embeddings as fraudulent (e.g., more than 80% of the matched embeddings were marked fraudulent), the input session 204 may be assigned a classification 312 to indicate that the input session 204 is also fraudulent. In some embodiments, a classification indicating that the input session 204 is not fraudulent may be assigned if the threshold number of matches is not met. In certain embodiments, a confidence score may be generated indicating the level of confidence with which the input session 204 was labeled as fraudulent (or not fraudulent).

Assigning the classification 312 to the input session 204 may be performed more than a threshold amount of time after the input session 204 is initiated (e.g., the user logs in) but prior to the termination of the input session 204. In other words, the process may be performed in real-time such that adverse events such as fraudulent activity may be detected without having to wait until the input session is completed (e.g., after the fraudulent has already occurred and information is compromised).

An indication of the classification 312 may then be displayed via a user interface (e.g., user interface 320) or sent to one or more elements of a software application. In one embodiment, the classification 312, along information related to the input session 204, the optimal embeddings 222, and/or the classification 312, may be compiled in report 322 and displayed via the user interface 320. For example, the report 322 may contain an indication of the particular session analyzed for potential fraudulent activity (e.g., by a session identification number), an indication of whether fraud was detected, an indication of the confidence score, and/or an indication of the previous sessions marked fraudulent that were matched to the input session (e.g., how many, their corresponding identification numbers, etc.), among others. In alternate embodiments, the report 322 may contain additional or fewer elements and/or information than is described here.

Example Operations Related to Automated Event
Detection Using Retrieval Augmented Generation
and Machine Learning Models FIG. 4 depicts example operations 400 related to automated event detection using retrieval augmented generation and machine learning models. For example, operations 400 may be performed by one or more of the components described with respect to FIG. 1, FIG. 2, and/or FIG. 3, and/or by one or more components of system 500 of FIG. 5, discussed below.

Operations 400 begin at step 402 with creating a directed graph for each of a plurality of interactive sessions based on attributes associated with the plurality of interactive sessions. In some embodiments, nodes in the directed graph correspond to one or more of: an event associated with a particular interactive session of the plurality of interactive sessions; a timestamp associated with the event; or an elapsed time from a previous event associated with the particular interactive session to the event.

Operations 400 continue at step 404 with generating an embedding of the directed graph for each of the plurality of interactive sessions.

Operations 400 continue at step 406 with storing the embedding of the directed graph for each of the plurality of interactive sessions in a vector database.

Operations 400 continue at step 408 with retrieving, in response to an input session, one or more embeddings related to the input session from the vector database. According to certain embodiments, the retrieving, in response to the input session, the one or more embeddings related to the input session from the vector database comprises generating the embedding of the input session and searching the vector database based on the embedding of the input session using a retrieval augmented generation technique.

Operations 400 continue at step 410 with selecting, using a language processing machine learning model, a subset of the one or more embeddings based on a prompt provided to the language processing machine learning model. Some embodiments provide that the selecting, using the language processing machine learning model, the subset of the one or more embeddings based on the prompt provided to the language processing machine learning model comprises determining K-most similar embeddings of the one or more embeddings by calculating distance scores between the embedding of the input session and each of the one or more embeddings.

Operations 400 continue at step 412 with comparing features associated with the subset of the one or more embeddings to features associated with an embedding of the input session.

Operations 400 continue at step 414 with performing an action based on the comparing. In certain embodiments, the performing of the action based on the comparing comprises assigning a classification to the input session upon determining that the embedding of the input session matches more than a threshold number of embeddings in the subset of the one or more embeddings that contain a particular label. According to some embodiments, the assigning the classification to the input session is performed more than a threshold amount of time after initiation of the input session and prior to termination of the input session. Certain embodiments provide that the method further comprises displaying an indication of the classification assigned to the input session via a user interface or sending the indication of the classification assigned to the input session to one or more elements of a software application.

Figure 5:
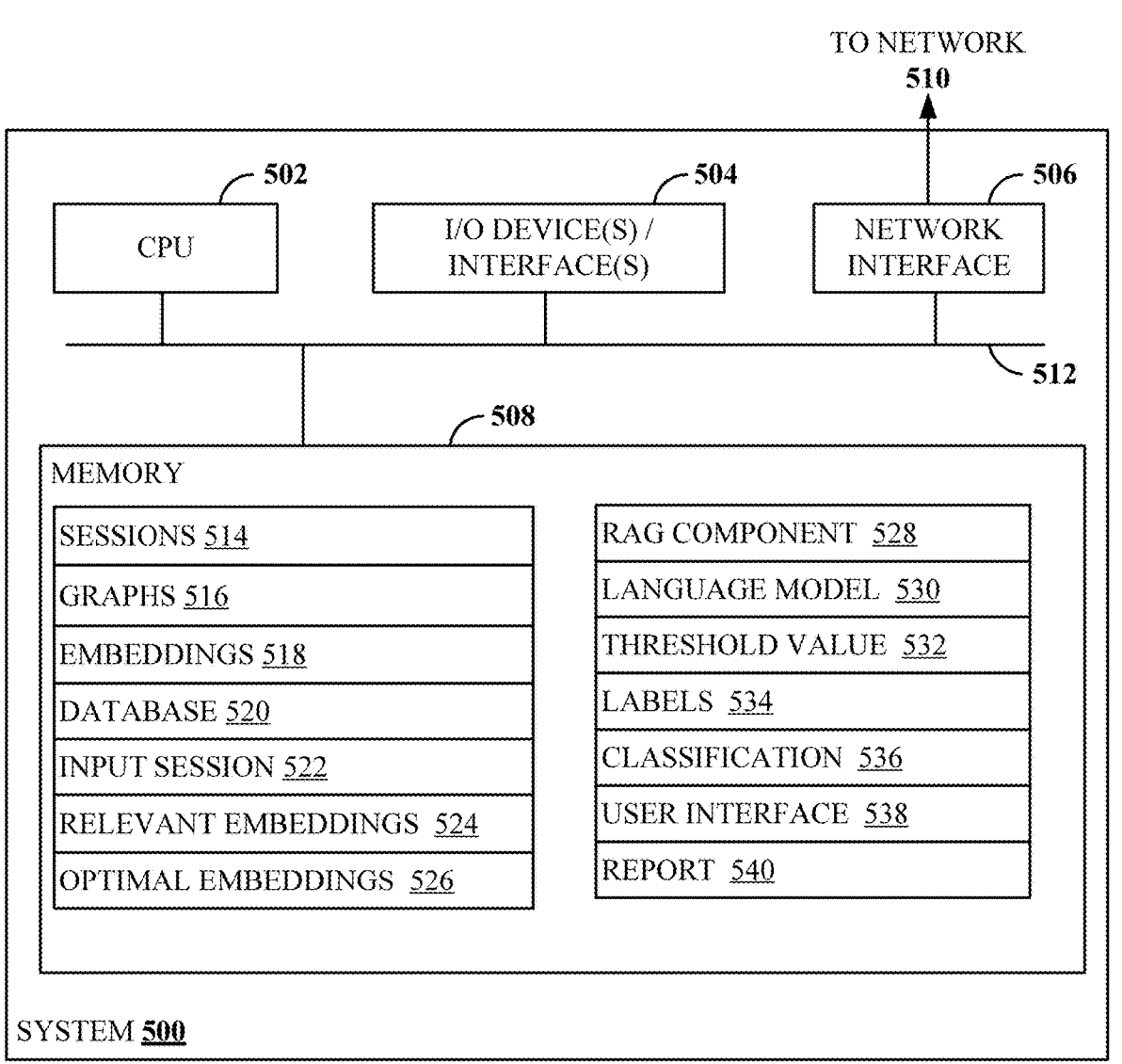
FIG. 5 depicts an example of a processing system for automated event detection using retrieval augmented generation and machine learning models.

Example of a Processing System for Automated
Event Detection Using Retrieval Augmented
Generation and Machine Learning Models FIG. 5 illustrates an example system 500 with which embodiments of the present disclosure may be implemented. For example, system 500 may be configured to perform operations 400 of FIG. 4 and/or to implement one or more components as in FIG. 1, FIG. 2, or FIG. 3.

System 500 includes a central processing unit (CPU) 502, one or more I/O device interfaces that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes sessions 514, graphs 516, embeddings 518, database 520, input session 522, relevant embeddings 524, and optimal embeddings 526. Sessions 514 may be representative of sessions 102 of FIG. 1. Graphs 516 may be representative of graphs 112 of FIG. 1. Embeddings 518 may be representative of embeddings 122 of FIG. 1 and FIG. 2. Database 520 may be representative of database 130 of FIG. 1. Input session 522 may be representative of input session 204 of FIG. 2 and FIG. 3. Relevant embeddings 524 may be representative of relevant embeddings 212 of FIG. 2. Optimal embeddings 526 may be representative of optimal embeddings 222 of FIG. 2 and FIG. 3.

Memory 508 further comprises RAG component 528 which may correspond to RAG component 215 of FIG. 2. Memory 508 further comprises language model 530, which may correspond to language model 225 of FIG. 2. Memory 508 further comprises threshold value 532, which may correspond to threshold value 302 of FIG. 3. Memory 508 further comprises labels 534 which may correspond to labels 304 of FIG. 3. Memory 508 further comprises classification 536 which may correspond to classification 312 of FIG. 3. Memory 508 further comprises user interface 538 which may correspond to user interface 320 of FIG. 3. Memory 508 further comprises report 540 which may correspond to report 322 of FIG. 3. It is noted that in some embodiments, system 500 may interact with one or more external components, such as via network 510, in order to retrieve data and/or perform operations. Furthermore, techniques described herein may be implemented via more or fewer components than those shown and described with respect to FIG. 5, such as on one or more computing systems.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automated fraud detection using retrieval augmented generation and machine learning models, comprising:

creating a directed graph for each of a plurality of interactive sessions based on attributes associated with the plurality of interactive sessions;

generating an embedding of the directed graph for each of the plurality of interactive sessions;

storing the embedding of the directed graph for each of the plurality of interactive sessions in a vector database;

retrieving, in response to an input session, one or more embeddings related to the input session from the vector database;

selecting, using a language processing machine learning model, a subset of the one or more embeddings based on a prompt provided to the language processing machine learning model, wherein the selecting comprises determining K-most similar embeddings of the one or more embeddings by calculating distance scores between an embedding of the input session and each of the one or more embeddings;

comparing features associated with the subset of the one or more embeddings to features associated with the embedding of the input session; and performing an action based on the comparing.

2. The method of claim 1, wherein nodes in the directed graph correspond to one or more of:
  an event associated with a particular interactive session of the plurality of interactive sessions;
  a timestamp associated with the event; or
  an elapsed time from a previous event associated with the particular interactive session to the event.

3. The method of claim 1, wherein the retrieving, in response to the input session, the one or more embeddings related to the input session from the vector database comprises generating the embedding of the input session and searching the vector database based on the embedding of the input session using a retrieval augmented generation technique.

4. The method of claim 1, wherein the performing of the action based on the comparing comprises assigning a classification to the input session upon determining that the embedding of the input session matches more than a threshold number of embeddings in the subset of the one or more embeddings that contain a particular label.

5. The method of claim 4, wherein the assigning the classification to the input session is performed more than a threshold amount of time after initiation of the input session and prior to termination of the input session.

6. The method of claim 4, further comprising displaying an indication of the classification assigned to the input session via a user interface or sending the indication of the classification assigned to the input session to one or more elements of a software application.

7. A system for automated fraud detection using retrieval augmented generation and machine learning models, comprising:
  one or more processors; and
  a memory comprising instructions that, when executed by the one or more processors, cause the system to:
    create a directed graph for each of a plurality of interactive sessions based on attributes associated with the plurality of interactive sessions;
    generate an embedding of the directed graph for each of the plurality of interactive sessions;
    store the embedding of the directed graph for each of the plurality of interactive sessions in a vector database;
    retrieve, in response to an input session, one or more embeddings related to the input session from the vector database;
    select, using a language processing machine learning model, a subset of the one or more embeddings based on a prompt provided to the language processing machine learning model, wherein the selecting comprises determining K-most similar embeddings of the one or more embeddings by calculating distance scores between an embedding of the input session and each of the one or more embeddings;
    compare features associated with the subset of the one or more embeddings to features associated with the embedding of the input session; and
    perform an action based on the comparing.

8. The system of claim 7, wherein nodes in the directed graph correspond to one or more of:
  an event associated with a particular interactive session of the plurality of interactive sessions;
  a timestamp associated with the event; or
  an elapsed time from a previous event associated with the particular interactive session to the event.

9. The system of claim 7, wherein the retrieving, in response to the input session, the one or more embeddings related to the input session from the vector database comprises generating the embedding of the input session and searching the vector database based on the embedding of the input session using a retrieval augmented generation technique.

10. The system of claim 7, wherein the performing of the action based on the comparing comprises assigning a classification to the input session upon determining that the embedding of the input session matches more than a threshold number of embeddings in the subset of the one or more embeddings that contain a particular label.

11. The system of claim 10, wherein the assigning the classification to the input session is performed more than a threshold amount of time after initiation of the input session and prior to termination of the input session.

12. The system of claim 10, wherein the instructions, when executed by the one or more processors, further cause the system to display an indication of the classification assigned to the input session via a user interface or sending the indication of the classification assigned to the input session to one or more elements of a software application.

13. A non-transitory computer readable medium comprising instructions that, when executed by one or more processors of a computing system, cause the computing system to:
  create a directed graph for each of a plurality of interactive sessions based on attributes associated with the plurality of interactive sessions;
  generate an embedding of the directed graph for each of the plurality of interactive sessions;
  store the embedding of the directed graph for each of the plurality of interactive sessions in a vector database;
  retrieve, in response to an input session, one or more embeddings related to the input session from the vector database;
  select, using a language processing machine learning model, a subset of the one or more embeddings based on a prompt provided to the language processing machine learning model, wherein the selecting comprises determining K-most similar embeddings of the one or more embeddings by calculating distance scores between an embedding of the input session and each of the one or more embeddings;
  compare features associated with the subset of the one or more embeddings to features associated with the embedding of the input session; and
  perform an action based on the comparing.

14. The non-transitory computer readable medium of claim 13, wherein nodes in the directed graph correspond to one or more of:
  an event associated with a particular interactive session of the plurality of interactive sessions;
  a timestamp associated with the event; or
  an elapsed time from a previous event associated with the particular interactive session to the event.

15. The non-transitory computer readable medium of claim 13, wherein the retrieving, in response to the input session, the one or more embeddings related to the input session from the vector database comprises generating the embedding of the input session and searching the vector database based on the embedding of the input session using a retrieval augmented generation technique.

16. The non-transitory computer readable medium of claim 13, wherein the performing of the action based on the comparing comprises assigning a classification to the input session upon determining that the embedding of the input session matches more than a threshold number of embeddings in the subset of the one or more embeddings that contain a particular label.

17. The non-transitory computer readable medium of claim 16, wherein the assigning the classification to the input session is performed more than a threshold amount of time after initiation of the input session and prior to termination of the input session.

<center>* * * * *</center>